S. ANDERSON.
SNAP FASTENER.
APPLICATION FILED JUNE 16, 1917.

1,241,806.

Patented Oct. 2, 1917.

Inventor
Samuel Anderson
By Joseph A. Miller
Attorney

UNITED STATES PATENT OFFICE.

SAMUEL ANDERSON, OF PAWTUCKET, RHODE ISLAND, ASSIGNOR TO THE WILLIAMS & ANDERSON CO., OF PROVIDENCE, RHODE ISLAND, A CORPORATION OF RHODE ISLAND.

SNAP-FASTENER.

1,241,806.  Specification of Letters Patent.  Patented Oct. 2, 1917.

Application filed June 16, 1917. Serial No. 175,080.

*To all whom it may concern:*

Be it known that I, SAMUEL ANDERSON, a citizen of the United States, residing at Pawtucket, in the county of Providence and State of Rhode Island, have invented a new and useful Improvement in Snap-Fasteners, of which the following is a specification.

This invention relates to certain new and useful improvements in a snap fastener, and it has for a primary object to provide an improved and efficient device of this character with a simple and reliable locking means for holding the fastener securely locked.

The invention consists in a pair of pivotally connected fastener members having openings normally registering to receive a locking member for holding the fastener closed, said openings having portions registrable when the fastener is opened to receive the locking member and thus permit of such opening movement of the fastener members.

Further, the invention resides in the features of construction hereinafter described and claimed, reference being had to the accompanying drawing wherein—

Figure 1:
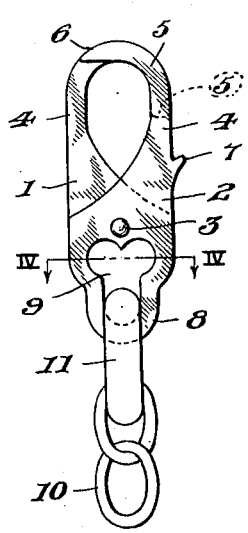
Figure 1 is a front elevation of the improved snap fastener in its operative or closed position.
Figure 2:
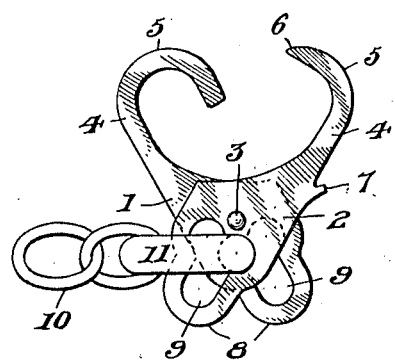
Fig. 2 is a similar view showing the fastener inoperative.
Figure 3:
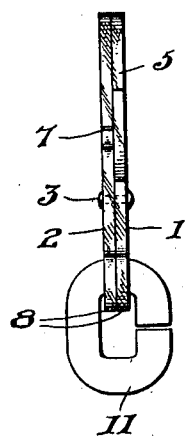
Fig. 3 is an edge elevation of the fastener closed.
Figure 4:
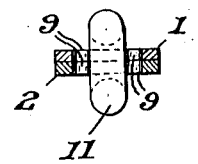
Fig. 4 is a transverse section on line 4—4 of Fig. 1.

Referring more in detail to the drawing, the fastener is composed of a pair of hook members 1 and 2 pivotally connected between their ends, as at 3, and each comprising a shank 4 and bill 5, the bill of hook member 2 being pointed, as at 6, and extending substantially at right angles from its shank, while the bill of the hook member 1 is curved backwardly and extended parallel with its shank. Both bills preferably coincide, when operatively related, and the hook member 2 is provided with a spur or finger pull 7 that is struck up, or otherwise formed thereon, to facilitate the opening action of the fastener.

Each fastener or hook member is formed with a broad flat tail piece 8 in which is formed a T-shaped slot or opening 9, said openings registering when the fastener is closed.

This snap fastener, although adapted for a wide usage, is here shown particularly in connection with a key chain 10, the same being connected to the locking ring 11 which is engaged in the registering slots. It is obvious that when the locking member 11 is engaged in the stems of the T-openings the hook members will be held against accidental opening.

When it is desired to open the fastener, the locking member is slid up into the cross bars of the T-openings and the hook member 2 pulled outwardly by engaging a tool or the finger nail beneath the spur 7.

The cross bar of each T-opening is here shown as being composed of interconnected circular openings so that when the fastener is opened the registering portions will form a complete circular opening to conformably receive and embrace the locking ring.

The locking member, in moving to its operative position, tends to shift the hook members into their full operative relation, in which position they are securely held.

Having thus described my invention, what I claim as new and desire to secure by Letters Patent is—

1. A snap fastener comprising a pair of companion hook members pivotally connected between their ends and provided adjacent one end with normally registering T-shaped openings, the cross bar of the T-openings being composed of interconnected circular openings, an end opening of one T-opening registering with the corresponding opposite end opening of the other T-opening when the hook members are opened, and a ring-like locking member engaging in the end openings, when the hook members are opened, and in the stem portions of the registering T-openings, when the hook members are closed, for locking them in the latter position.

2. A snap fastener comprising a pair of companion hook members pivotally connected between their ends and provided adjacent one end with normally registering T-shaped openings, the cross bars of the T-openings being composed of interconnected circular openings, an end opening of one cross bar registering with the opposite end opening of the other cross bar when the hook members are opened, and a locking member slidable in the T-openings for engaging in their registering stems when the hook members are closed to hold them closed.

3. A snap fastener comprising a pair of companion hook members pivotally connected between their ends and provided adjacent one end with normally registering T-shaped openings, a portion of the cross bars of the T-openings registering when the hook members are opened, and a locking member engaging in the registering portions of the openings when the members are opened and in the registering stems of said openings when the hook members are closed for holding them closed.

In testimony whereof I have signed my name to this specification in the presence of two subscribing witnesses.

SAMUEL ANDERSON.

Witnesses:
ADA E. HAGERTY,
J. A. MILLER.